(No Model.)

E. H. JUDKINS.
COFFEE POT.

No. 311,990. Patented Feb. 10, 1885.

Witnesses,
Geo. H. Strong.
J. H. Kruse.

Inventor,
E. H. Judkins
By Dewey & Co.
Attorneys

UNITED STATES PATENT OFFICE.

EDWIN H. JUDKINS, OF SAN FRANCISCO, ASSIGNOR OF ONE-HALF TO JOSIAH W. TUCKER, OF OAKLAND, CALIFORNIA.

COFFEE-POT.

SPECIFICATION forming part of Letters Patent No. 311,990, dated February 10, 1885.

Application filed May 8, 1884. (No model.)

*To all whom it may concern:*

Be it known that I, EDWIN H. JUDKINS, of the city and county of San Francisco and State of California, have invented an Improvement in Coffee-Pots; and I hereby declare the following to be a full, clear, and exact description thereof.

My invention relates to the class of coffee-pots and to a certain new and useful improvement therein; and my invention consists in a novel adjustable or removable strainer placed upon the inside of the pot and covering the base or entrance of the spout, as I shall hereinafter more fully explain.

The object of my invention is to provide suitable and convenient means within the pot itself, whereby the coffee can be poured directly from the vessel in which it is boiled and still be clear and free from grounds.

Figure 1:
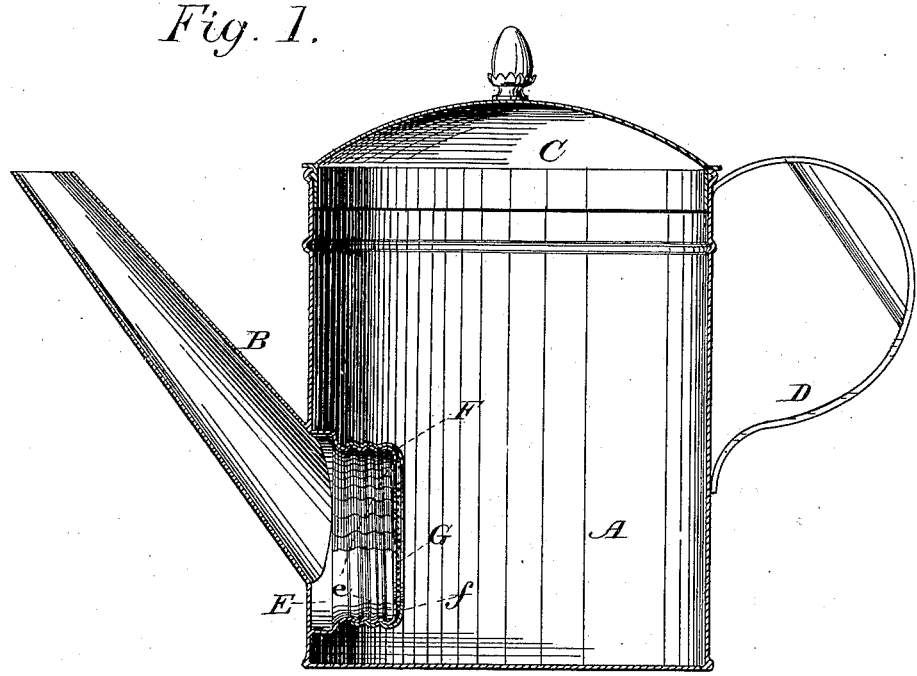
Figure 2:
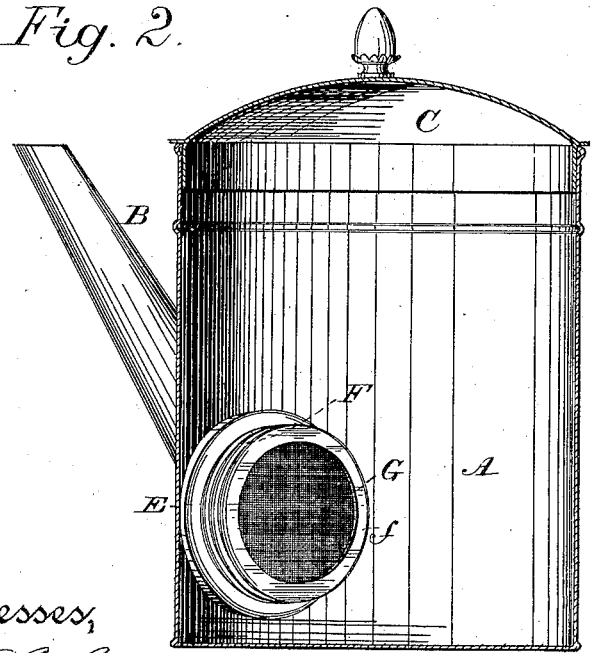

Referring to the accompanying drawings, Figure 1 is a vertical section of my coffee-pot. Fig. 2 is a vertical section showing the annular projection and strainer in oblique elevation.

A is the pot, and B is its spout. C is its lid or cover, and D its handle. Upon the inside of the pot, and surrounding the entrance to the spout, is formed or secured an annular projection, E, externally threaded, and having an inwardly-extending annular flange, $e$.

F is an internally-threaded band, having an inwardly-extending annular flange, $f$. Against this flange and within the band are laid one or more strainer-disks, G, of wire or other cloth having a suitably-fine mesh. The band is then fitted to and screwed upon the threaded projection E until the strainers are bound and held by and between the flanges $e f$. It is obvious that this strainer device can be readily adjusted and as easily removed, whereby it can be renewed when necessary and always kept sweet and clean.

The coffee can be boiled in the pot and served directly from it as clear as if it had passed through the usual supplementary straining operations. The pot itself is kept clear of such incumbrances as are found in some coffee-pots, such as a suspended straining-bag or a perforated diaphragm, forming the pot into two compartments. The effect of the boiling upon the coffee is thus had to a better advantage by boiling it directly with and while free within the water, and such additions as eggs, &c., need not be used to clear it, for the strainer prevents the grounds from passing out.

It is obvious that the pot may be used as a tea-pot or for any other purpose, such as in milking, where the liquid requires to be strained. The position of the strainer—namely, within the pot—is advantageous in being out of the way, in being accurate in its operation, and in enabling me to make a more sightly vessel. Its adjustable or removable character or feature is obviously of great advantage in providing for cleanliness.

Having thus described my invention, what I claim as new, and desire to secure by Letters Patent, is—

1. In a coffee-pot having a spout, an annular externally-threaded projection, E, formed upon or secured to the inner surface of the pot and encircling the entrance to the spout, in combination with an internally-threaded cap or band, F, adapted to be screwed upon the projection E, and a suitable strainer or strainers, G, secured over the face of the annular projection by the cap or band, substantially as herein described.

2. In a coffee-pot having a spout, an annular externally-threaded projection, E, formed upon or secured to the inner surface of the pot and encircling the entrance to the spout, said projection having an annular flange, $e$, in combination with the annular cap or band F, internally threaded and adapted to be screwed upon the projection $e$, said cap or band having an annular flange, $f$, and the strainer disk or disks G, fitted within the cap or band and held between the flanges $f e$, substantially as herein described.

In witness whereof I have hereunto set my hand.

EDWIN H. JUDKINS.

Witnesses:
S. H. NOURSE,
H. C. LEE.